United States Patent
Raudies et al.

(10) Patent No.: US 12,451,682 B2
(45) Date of Patent: Oct. 21, 2025

(54) MULTIPLE-MODE LOAD PROTECTION DEVICE

(71) Applicant: Rockwell Automation Switzerland GmbH, Aarau (CH)

(72) Inventors: Andreas Pascal Raudies, Aarau (CH); Reynald Kaltenrieder, Muhen (CH); Ashwinkumar Patel, Suhr (CH); Mark Roger Bjerke, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 294 days.

(21) Appl. No.: 18/191,288

(22) Filed: Mar. 28, 2023

(65) Prior Publication Data
US 2024/0332944 A1    Oct. 3, 2024

(51) Int. Cl.
*H02H 3/08* (2006.01)
*H02H 7/08* (2006.01)

(52) U.S. Cl.
CPC ............ *H02H 3/08* (2013.01); *H02H 7/0833* (2013.01)

(58) Field of Classification Search
CPC .......... H02H 3/08; H02H 7/0833; H02H 7/09; H02H 7/085
USPC .......................................................... 361/79
See application file for complete search history.

(56) References Cited

U.S. PATENT DOCUMENTS

| 4,858,053 A | 8/1989 | Profio | |
| 5,172,291 A * | 12/1992 | Bakely | H02H 3/08 361/85 |
| 2009/0154042 A1* | 6/2009 | Zisman | H02H 1/0092 361/87 |
| 2009/0231892 A1* | 9/2009 | Klikic | H02J 9/062 363/56.1 |

FOREIGN PATENT DOCUMENTS

CN      105576611 B      3/2018

OTHER PUBLICATIONS

Extended European Search Report from European Patent Office for EP24163584.6-1002 dated Sep. 16, 2024, 20 pages.

* cited by examiner

*Primary Examiner* — Kevin J Comber

(57) ABSTRACT

The present technology relates to multiple mode circuit and load protection devices configured to operate differently in each of the multiple modes. The protection device includes three power inputs and three corresponding power outputs. The protection device can be set to a motor protection mode or a circuit breaker mode. When set to the motor protection mode, the protection device detects a phase imbalance between the three inputs, analyzes electrical values associated with the three inputs and, detects a fault based on detecting a phase imbalance or detecting a failure based on one of the electrical values. When set to the circuit breaker mode, the protection device will disable measurement of or otherwise ignore phase imbalances and only detect a fault based on one of the electrical values. In response to detecting a fault, the protection device can trip, stopping current flow to load(s) coupled to the power outputs.

20 Claims, 5 Drawing Sheets

MULTIPLE-MODE LOAD PROTECTION DEVICE

TECHNICAL FIELD

Various embodiments of the present technology relate to protection devices in industrial automation environments and particularly to multiple-mode protection devices.

BACKGROUND

Industrial automation environments, such as factories, mills, and the like, employ various devices, drives, machinery, and other components to perform industrial processes. Such industrial systems and components operate using power from a power transmission line. The power transmission line feeds single-phase, two-phase, or three-phase alternating current (AC) power to devices. Today, a motor protective switching device (MPSD's) with phase loss sensitivity requires three-phase alternating current; it cannot be used in a single-phase or two-phase application unless all three poles are wired in series. On the other hand, molded case circuit breakers (MCCB's) are not suitable for motor protection.

To protect the load and the circuit from harm caused by electrical or mechanical faults in industrial or commercial environments, circuit protectors, surge protectors, disconnect switches, fuses, and other monitoring devices are implemented between the load and the power line. Often, these devices serve a single purpose with limited protection functionality, so industrial automation and commercial environments require the use of multiple different devices to account for various types of electrical and mechanical faults.

SUMMARY

A protection device configurable to operate in one of multiple modes to protect various types of loads is provided herein. In one mode, the protection device can function as a circuit breaker (e.g., a molded case circuit breaker (MCCB)) capable of protecting a branch circuit. As a circuit breaker, the protection device can operate in single-phase applications, two-phase applications, or in three-phase applications depending on load requirements. In a different mode, the protection device can function as a manual motor starter (e.g., a motor protective switching device (MPSD)) capable of protecting a motor. In some examples, the mode of the protection device can be selected via a physical switch of the protection device. In other examples, however, the mode can be selected via a mode selection setting, such as a setting in firmware.

In an embodiment of the present technology, a protection device comprising three power inputs, three power outputs, three circuits, each circuit corresponding to one of the three power inputs and one of the three power outputs, a processor, a switching system, and a memory is provided. The memory comprises phase loss logic that, when executed by the processor, detects a phase imbalance between the three power inputs and transmits a phase loss signal to the switching system in response to the phase imbalance exceeding an imbalance threshold value; protection logic that, when executed by the processor, analyzes electrical values associated with the three power inputs and transmits a signal to the switching system to impede current flow within the three circuits and to the corresponding power output, based on at least one of detection of the phase loss signal and detection of a failure based on the electrical values exceeding an overload threshold value; and switching logic that, when executed by the processor, enables the phase loss logic based on detecting a first mode of two modes of the protection device and disables the phase loss logic based on detecting a second mode of the two modes.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
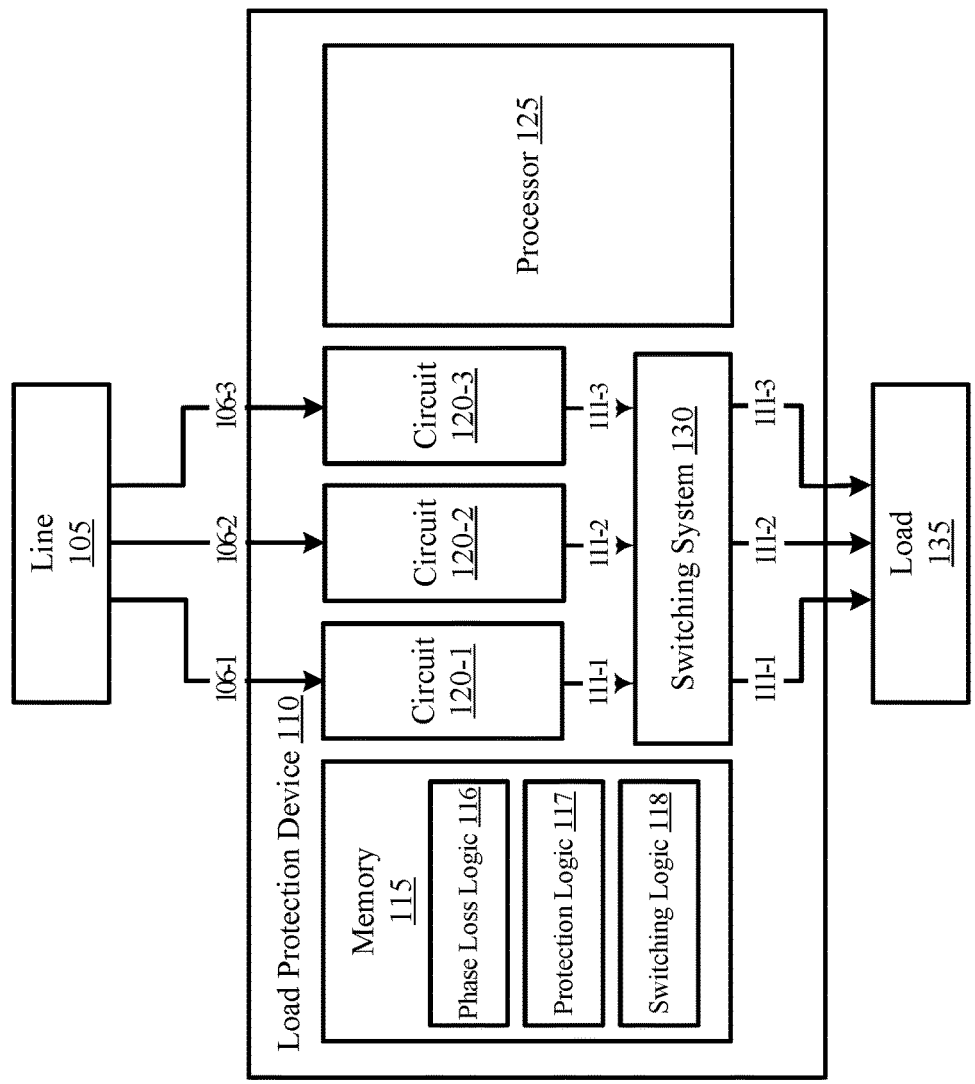
FIG. 1 illustrates an example operating environment including a protection device in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to circuit and load protection in industrial automation environments. In industrial automation environments, various devices, such as circuit breakers and switching devices, require certification under the standards of the International Electrotechnical Commission (IEC) to be used in industrial processes. These standards address functionality, performance, and/or compatibility concerns, among other aspects, of devices. More specifically, IEC standard IEC/EN/UL 60947-4-1, which applies to motor protective switching devices (MPSDs), ensures that such devices function safely with motors and have safeguards to protect motors in the case of failures. For example, this IEC standard requires that a MPSD has short-circuit protection, current overload protection, and phase loss protection. Short-circuit and current overload protection refers to protection against excessive current, or current beyond acceptable limits of a load. Phase loss protection refers to protection against current with one or more phases out-of-sync from another phase. IEC standard IEC/EN 60947-2, which applies to circuit breakers, ensures that such devices have safeguards to protect non-motor loads (e.g., heaters, transformers, control circuitry, lighting) in the case of failures. For example, this IEC standard requires a circuit breaker to have short circuit protection and current overload protection.

Existing devices used in industrial automation or commercial environments do not function as both circuit breakers and switching devices without restrictions, in part because of these IEC standards, but more importantly because the existing devices will not function properly if not used for the correct implementation. For example, switching devices, with phase loss protection capabilities, are sensitive to phase imbalances between phases of AC power fed by a power line. This means that a phase imbalance exceeding a threshold amount can cause the switching device to trip or detect a failure and impede AC power to flow through the switching device to a motor. Circuit breakers, on the other hand, do not need this functionality for certification purposes nor can they function in three-phase applications with phase loss protection enabled. Circuit breakers operating in three-phase applications may use three phases of the AC power input, despite any phase imbalance, to provide protection for up to three non-motor loads, but if the device also includes phase loss protection, the device may trip due to sensitivity to phase imbalance. However, having multiple different types of protection devices increases the number of devices and stock keeping units (SKUs) of an industrial automation system. Additional devices and SKUs increase the cost of the industrial automation system.

To address these issues, described herein is a multi-mode protection device that can operate, within standards, as either a circuit breaker or a switching device. One mode includes a circuit breaker mode to use the protection device with non-motor loads. The other mode includes a motor protective switching device mode to use the protection device with motor loads. When the circuit breaker mode is selected, some circuitry or logic of the protection device related to phase loss protection can be disabled to prevent tripping of the device due to phase imbalance. When the switching device mode is selected, the phase loss protection is enabled to ensure phase imbalances are detected and trip the protection device appropriately. The modes of the protection device can be selected using a switch. In some instances, the switch can be implemented as hardware, such as a physical switch. In other instances, the switch can be implemented as software or firmware.

In an embodiment, a protection device is provided. The protection device has three power inputs, three power outputs, three circuits, each circuit corresponding to one of the three power inputs and one of the three power outputs, a processor, a switching system, and a memory. The memory includes phase loss logic, protection logic, and switching logic that are executed by the processor to provide protection to loads coupled to the protection device. The phase loss logic detects a phase imbalance between the three power inputs. If the detected phase imbalance exceeds an imbalance threshold value, the processor transmits a phase loss signal to the switching system. The protection logic analyzes electrical values associated with the three power inputs. If the analyzed electrical values exceed an overload threshold value, a failure can occur. Based on either detection of the phase loss signal or detection of a failure, the processor transmits a signal to the switching system to impede current flow within the three circuits. The switching logic enables the phase loss logic when the protection device is in a first mode (e.g., motor protection mode) and disables the phase loss logic when the protection device is in a second mode (e.g., circuit breaker mode).

In another embodiment, a method of implementing a multi-mode protection device may include receiving, at the protection device, three power inputs, each corresponding to one of three circuits within the protection device. Logic within the protection devices may determine which mode the protection device is in (e.g., motor protection mode or circuit breaker mode). In the first mode (e.g., motor protection mode), switching logic may enable phase loss logic so that phase loss analysis and circuit protection analysis may be continuously performed. Phase loss analysis may include detecting phase imbalances between the three power inputs. Circuit protection analysis may include analyzing electrical values associated with the three power inputs, which includes the phase imbalance. A fault may be detected if either or both the phase imbalance exceeds an imbalance threshold value or an electrical value exceeds an overload threshold value. When a fault is detected, a signal may be transmitted to a switching system to impede current flow within the three circuits (i.e., to trip the circuits, such that no power flows to outputs of the protection device). In a second mode (e.g., the circuit breaker mode), the switching logic can disable the phase loss analysis. In either mode the circuit protection analysis may be continuously performed. In this second mode, a fault may be detected based on the detection of an electrical value exceeding the second threshold value, and if detected, the signal may be transmitted to the switching system to impede current flow within the three circuits (i.e., to trip the circuits, such that no power flows to the outputs).

Advantageously, a multiple mode protection device, such as one disclosed herein, can satisfy IEC standards related to both circuit breakers and switching devices. This allows an industrial automation system to include fewer devices, and thus, reduce the number of SKUs in the system. Additionally, this reduces overhead for purchasing, maintaining, and licensing multiple devices for a system. Further, the protection device can function as a two-in-one device to protect various types of loads, including both motors and non-motors, from AC power issues. Such a protection device can protect up to three non-motor loads in single-phase applications, one non-motor load in two-phase applications (with or without an additional non-motor load in a single-phase application), one non-motor load in three-phase applications, or one motor load in three-phase applications. Despite use under one scenario, the protection device can include phase loss logic (phase sensitivity logic) that can be enabled or disabled to operate under any of these scenarios and can be re-configured accordingly.

Turning now to the Figures, FIG. 1 illustrates an example operating environment 100 including a protection device 110 in accordance with some embodiments of the present technology. Operating environment 100 includes line 105, AC signals 106, load protection device 110, AC signals 111, switching system 130, and load 135.

Line 105 is representative of an AC power supply, such as a power grid. Line 105 produces AC signals (AC signal 106-1, AC signal 106-2, and AC signal 106-3; collectively referred to herein as AC signals 106), each AC signal having a different phase with respect to one another. For example, in a traditional grid, line 105 may produce voltage and current being 120 degrees out of phase from one another. Line 105 feeds the AC signals 106 to load protection device 110, which measures and analyzes AC signals 106 before providing power from line 105 to load 135.

AC signal 106-1 is a first AC signal produced by line 105. AC signal 106-1 includes a voltage and a current capable of providing power to load 135, among other loads. AC signal 106-1 is one of three AC signals 106 that function together to provide three-phase AC power in an industrial automation environment.

AC signal 106-2 is a second AC signal produced by line 105. AC signal 106-2 includes the same voltage and current as AC signal 106-1, but at a different phase with respect to AC signal 106-1.

AC signal 106-3 is a third AC signal produced by line 105. AC signal 106-3 includes the same voltage and current as AC signals 106-1 and 106-2, but at a different phase with respect to both AC signals 106-1 and 106-2.

Load protection device 110 includes memory 115, circuits 120, processor 125, and switching system 130. Load protection device 110 is representative of a circuit and load protection component coupled between a power supply (line 105) and a load (load 135) in an industrial or commercial environment. Load protection device 110 is provided to protect load 135 from power issues stemming from AC signals 106. To provide such protection, load protection device 110 includes memory 115 that further includes logic, circuits 120-1, 120-2, and 120-3 (collectively referred to herein as circuits 120), each coupled to one of AC signals 106, and processor 125 configured to execute the logic stored on memory 115 and control current flow from line 105 through circuits 120.

Circuits 120 includes circuits 120-1, 120-2, and 120-3, each individually coupled to a current input (e.g., one of AC signals 106) and configured to produce a current output (e.g., one of AC signals 111) fed through switching system 130. For example, circuit 120-1 is fed AC signal 106-1 and outputs AC signal 111-1, circuit 120-2 is fed AC signal 106-2 and outputs AC signal 111-2, and circuit 120-3 is fed AC signal 106-3 and outputs AC signal 111-3.

Each of AC signals 111-1, 111-2, and 111-3 are fed to switching system 130. Switching system 130 may include components and circuitry that allow or impede current flow between a corresponding input and output. For example, switching system 130 may include a conductive path that includes a switch. When the switch is closed, switching system 130 allows the current to flow through circuits 120-1, 120-2, and 120-3 to load 135. When the switch is open, switching system 130 impedes the current flow between circuits 120-1, 120-2, and 120-3 and load 135 because the conductive path is broken. Stated differently, circuits 120 may be configured to pass current (e.g., AC signals 111-1, 111-2, and 111-3; collectively referred to herein as AC signals 111) from line 105 to load 135 via a conductive path. Switching system 130 may instead, however, impede current flow from line 105 to load 135 when the load protection device 110 trips and switching system 130 breaks the conductive path. The conductive path may be broken using, for example, a switch, based on electrical values of AC signals 106. In the case where the load protection device 110 is tripped, circuits 120 do not output AC signals 111 to load 135 as a protective measure.

Memory 115 may be any computer-readable storage media device capable of being read from and written to by processor 125. Memory 115 may include volatile and non-volatile, removable and non-removable media implemented in any method of technology for storage of information. For example, memory 115 may include random access memory (RAM), static RAM (SRAM), dynamic RAM (DRAM), double data rate (DDR), flash memory, tightly coupled memory (TCM), or any other type of memory or combination or variation thereof. Memory 115 is shown as a single memory device but may be implemented as one or more memory devices and may include device(s) for storing software and firmware. Memory 115 is not a transitory signal in any embodiment. Memory 115 may be implemented separately or in an integrated manner with respect to other types of memory.

As illustrated in operating environment 100, memory 115 includes phase loss logic 116, protection logic 117, and switching logic 118. In various embodiments, phase loss logic 116, protection logic 117, and switching logic 118 include program instructions executable by processor 125. While shown as three logic modules in FIG. 1, phase loss logic 116, protection logic 117, and switching logic 118 are used to describe the functionality included and may be implemented in any number of modules or included in a program or with instructions that perform other functionality without departing from the scope of this description.

Phase loss logic 116 may implement phase loss sensitivity in load protection device 110. Phase loss logic 116 may include instructions that are executable by processor 125. Phase loss logic 116 may measure or detect a phase imbalance between AC signals 106-1, 106-2, and 106-3. This may entail measuring the phase of AC signals 106-1, 106-2, and 106-3 individually, then performing a comparison of the three phases to identify whether the phases are imbalanced, or out-of-phase, or not. Phase loss logic 116 may transmit a phase loss signal to switching system 130 in response to a phase imbalance exceeding a first threshold value. In various cases, the first threshold value can be set, or programmed, in memory 115. In other cases, the first threshold value may be a pre-configured value in the instructions. The first threshold value may also include a set of phase values, each phase value corresponding to the phase of one of AC signals 106-1, 106-2, and 106-3.

Protection logic 117 may implement short-circuit and power overload protection in load protection device 110 (i.e., load and circuit protection and branch circuit protection). Protection logic 117 may include instructions that are executable by processor 125. Protection logic 117 may analyze electrical values associated with AC signals 106-1, 106-2, and 106-3. This may entail measuring the current, voltage, and other electrical values provided by AC signals 106-1, 106-2, and 106-3 to circuits 120-1, 120-2, and 120-3, respectively. Protection logic 117 may transmit a signal in response to either or both a detection of the phase loss signal (from phase loss logic 116) or a detection of a failure based on the electrical values exceeding a second threshold value. In various instances, the second threshold value is a pre-configured value determined based on a load fed by load protection device 110. In other instances, the second threshold value may be set in memory 115 based on characteristics of line 105 and/or load protection device 110. By way of example, processor 125, when executing protection logic 117, can identify that AC signal 106-1 is providing excessive current (exceeding the second threshold or overload threshold value) to circuit 120-1, such that the current may cause harm to load 135. Upon detecting a current overload, processor 125 can transmit a signal to switching system 130 to impede current flow through all circuits 120. Thus, all circuits 120 would not output AC signals 111 to load 135. By way of another example, processor 125 can identify that a phase loss signal was transmitted due to a phase imbalance between AC signals 106. Accordingly, processor 125 can impede current flow from line 105 to load 135 via switching system 130.

Switching logic 118 may enable or disable logic of load protection device 110. Switching logic 118 may include instructions that are executable by processor 125. Switching logic 118 may enable phase loss logic 116 in response to detecting that load protection device 110 is in a first mode of two modes. Additionally, switching logic 118 may disable phase loss logic 116 in response to detecting that load protection device 110 is in a second mode of the two modes. In various embodiments, the two modes of load protection device 110 include a motor protection mode (first mode) and a circuit breaker mode (second mode).

In the first mode, motor protection mode, processor 125 enables phase loss logic 116, based on the switching logic instructions. Phase loss logic is enabled so that current flow can be impeded through circuits 120 based on detection of a phase imbalance. This allows load protection device 110 to protect motors from AC signals that are out-of-phase and may be harmful to the motors.

In the second mode, circuit breaker mode, processor 125 disables phase loss logic 116, based on the switching logic instructions. Phase loss logic is disabled so that current flow is not impeded through circuits 120 based on detection of a phase imbalance between AC signals 106. This allows load protection device 110 to protect non-motor loads without phase loss sensitivity impacting operations of load protection device 110. Disabling phase loss logic 116 may entail inhibiting at least a portion of phase loss logic 116 (i.e., the portion of instructions that transmits a phase loss signal) from being executed, such that no phase loss signal is transmitted in response to detecting a phase imbalance between AC signals 106. Alternatively, disabling phase loss logic 116 may entail inhibiting the detection of a phase loss signal. Under this scenario, processor 125 may either detect the phase loss signal and fail to transmit it to a component of load protection device 110, or it may fail to detect the phase loss signal entirely.

In some instances, load protection device 110 includes a mode switch, such as a physical switch, knob, button, and the like. Switching logic 118 can detect whether load protection device 110 is in the first mode or the second mode based on a state (e.g., a position) of the mode switch. In other instances, load protection device 110 includes a mode selection setting stored in memory 115. Switching logic 118 can detect whether load protection device 110 is in the first mode or the second mode based on a state of the mode selection setting. For example, the mode selection setting can be embodied as a value set in memory. The mode selection setting may be user-defined during operation of load protection device 110 via software or a graphical user interface, pre-configured during manufacturing of load protection device 110, set during or via a firmware installation or update, or any variation or combination thereof.

Processor 125 is representative of any processor or processing unit capable of executing instructions stored in memory such as phase loss logic 116, protection logic 117, and switching logic 118 from memory 115. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof. Regardless, processor(s) utilized by components of load protection device 110 described herein can be implemented within a single processing device or distributed across multiple processing devices or sub-systems that cooperate in executing program instructions in memory 115.

AC signal 111-1 is a first AC output signal from load protection device 110 corresponding to AC signal 106-1. Accordingly, AC signal 111-1 has the same electrical values, including phase, voltage, and current, as AC signal 106-1. AC signal 111-2 is a second AC output signal corresponding to AC signal 106-2. AC signal 111-2 also has the same electrical values as AC signal 106-2. AC signal 111-3 is a third AC output signal from load protection device 110 corresponding to AC signal 106-3. It follows that AC signal 111-3 also has the same electrical values as AC signal 106-3. Together, AC signals 111 can provide three-phase AC power to load 135. Alternatively, AC signals 111 can individually provide single-phase or two-phase AC power to load 135.

Load 135 is representative of any one or more (up to three) devices or systems in an industrial or commercial environment configured to receive and operate using AC power from a power supply, such as line 105. In some instances, load 135 includes a device, such as a motor or a non-motor, that functions using three-phase AC power. Accordingly, load 135 can receive AC signals 111, each signal at a different phase with respect to one another. In other instances, load 135 includes three non-motors, each of which can function using single-phase AC power. In such instances, AC signal 111-1 can be provided to a first load, AC signal 111-2 can be provided to a second load, and AC signal 111-3 can be provided to a third load.

In use, load protection device 110 functions as either a circuit breaker or a motor protective switching device whereby it receives AC signals 106 from line 105, measures electrical values of AC signals 106 to detect issues, and either provides AC signals 111 to load 135 or impedes current from flowing through circuits 120, via switching system 130, based on whether processor 125 of load protection device 110 detects any issues with AC signals 106 or not based on executing the phase loss logic 116, protection logic 117, and switching logic 118. While in a circuit breaker mode, load protection device 110 can provide overload and short-circuit protection to one or more loads. Phase loss logic 116 can be disabled by executing switching logic 118, such that processor 125 allows current to flow through circuits 120 despite any phase imbalance between AC signals 106. However, while in motor protection mode, load protection device 110 can provide overload, short-circuit, and phase loss, or imbalance, protection to a load. Thus, load protection device 110 can impede current flow through circuits 120 in the case of any phase imbalance or current overload.

Figure 2:
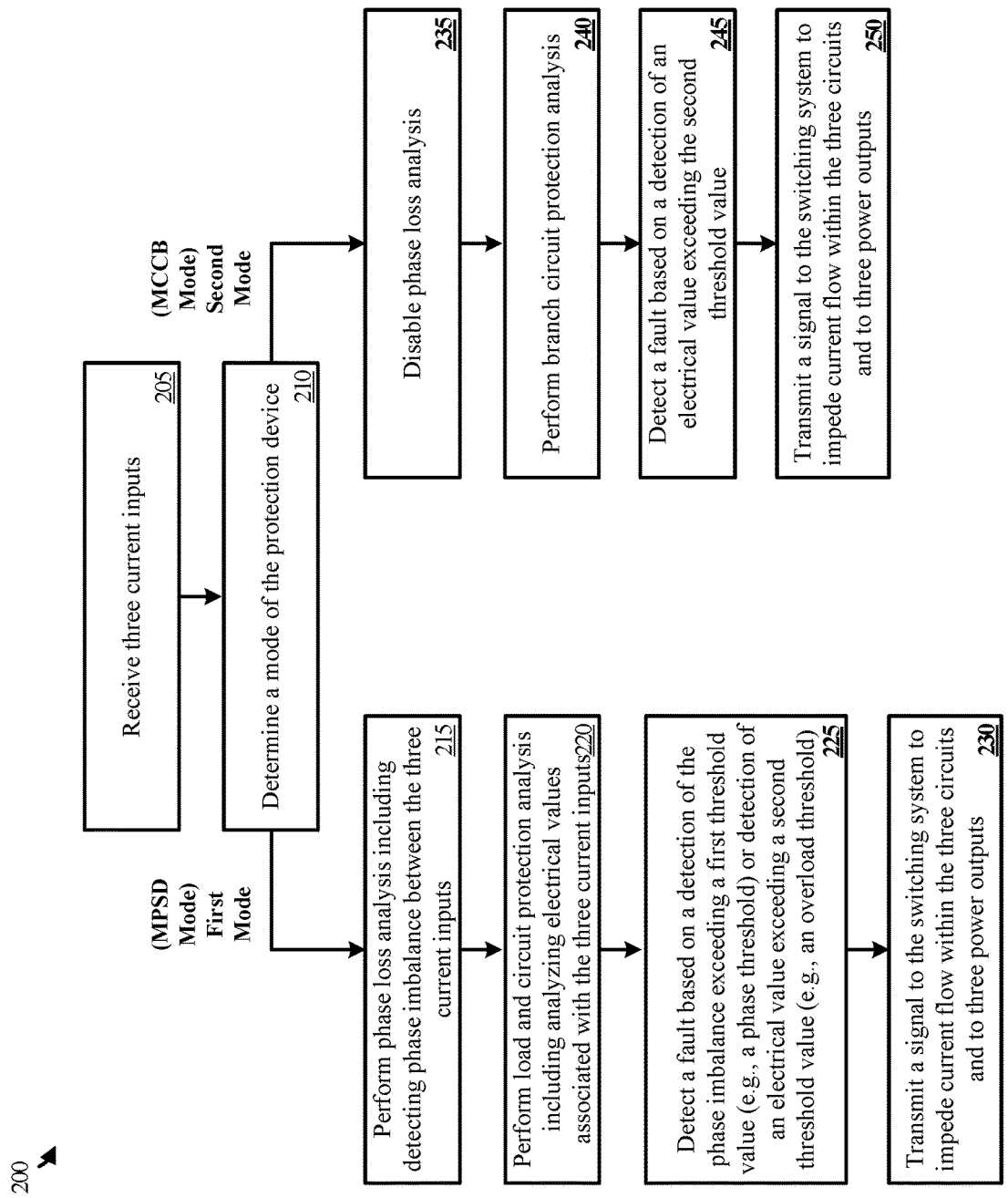
FIG. 2 illustrates a series of steps for operating a protection device in multiple modes in accordance with some embodiments of the present technology.

FIG. 2 illustrates a series of steps for operating a protection device in multiple modes in accordance with some embodiments of the present technology. FIG. 2 includes process 200, each operation noted parenthetically in the discussion below and which reference elements of FIG. 1. It may be appreciated that process 200 can be implemented on software, firmware, hardware, or any combination or variation thereof. For example, process 200 can be executed on or by load protection device 110 of FIG. 1. More specifically, process 200 can include the execution of phase loss logic 116, protection logic 117, and switching logic 118 on memory 115 by processor 125, as in the description of FIG. 1.

In operation 205, load protection device 110 receives (205) three power inputs (AC signals 106) from line 105. The three power inputs, AC signals 106-1, 106-2, and 106-3, each include a voltage and a current capable of providing power to a load (e.g., load 135). Each of AC signals 106 also has a different phase with respect to one another, thus, the three power inputs can provide three-phase AC power to the load. Load protection device 110 includes three circuits, circuits 120-1, 120-2, and 120-3, each configured to receive one of AC signals 106. For example, circuit 120-1 can receive AC signal 106-1, circuit 120-2 can receive AC signal 106-2, and circuit 120-3 can receive AC signal 106-3.

Next, in operation 210, processor 125 of load protection device 110 determines (210) a mode of load protection device 110. Load protection device 110 can operate in one of two modes: the first mode is a motor protection mode (e.g., a motor protective switching device mode), and the second mode is a circuit breaker mode (e.g., a molded case circuit breaker mode). In some instances, load protection device 110 includes a mode switch, such as a physical switch, knob, button, and the like. In other instances, load protection device 110 includes a mode selection setting stored in memory 115. Processor 125 can determine which mode load protection device 110 is in by executing switching logic 118 stored in memory 115.

Based on the determination, in operation 210, that load protection device 110 is in the first mode (e.g., motor protection mode), processor 125 can enable (using switching logic 118 to enable) and continuously perform (215) phase loss analysis (phase loss logic 116) including measuring phase imbalance between the three power inputs. Phase imbalance may occur when one or more phases of the three power inputs is out-of-sync with respect to the other phases. To perform phase loss analysis, processor 125 can execute phase loss logic 116, which may include instructions, to detect a phase imbalance between AC signals 106-1, 106-2, and 106-3. This may entail measuring the phase of AC signals 106-1, 106-2, and 106-3 individually, then performing a comparison of the three phases to identify whether the phases are imbalanced, or out-of-phase, or not. In the case that processor 125 detects a phase imbalance that exceeds a threshold (or a set of thresholds corresponding to each of AC signals 106), processor 125 can transmit a phase loss signal to switching system 130.

Next, in operation 220, processor 125 continuously performs (220) load and circuit protection analysis (protection logic 117) including analyzing electrical values associated with the three power inputs. In doing so, load protection device 110 attempts to identify current overloads from line 105 that may cause damage to load 135 if provided to load 135. To perform circuit protection analysis, processor 125 can execute protection logic 117, which may include instructions, to analyze electrical values associated with AC signals 106. This may entail measuring the current, voltage, and other electrical values provided by AC signals 106 to circuits 120. For example, processor 125 can measure the electrical values of AC signal 106-1 at circuit 120-1, the electrical values of AC signal 106-2 at circuit 120-2, and the electrical values of AC signal 106-3 at circuit 120-3.

In operation 225, processor 125 detects (225) a fault based on either or both a detection of the phase imbalance exceeding a first threshold value or a detection of an electrical value of the values analyzed exceeding a second threshold value indicative of an overload. This may entail performing a comparison between the detected phase imbalance and the first threshold value and performing a comparison between each of the analyzed electrical values and the second threshold value. The threshold values may be values pre-configured values. However, in other cases, the threshold values can be set, or programmed, in memory 115.

In response to detecting the fault, in operation 230, processor 125 transmits (230) a signal to switching system 130 to impede current flow within each circuit of circuits 120 and to load 135 via AC signals 111. By way of example, processor 125 can identify that line 105 is providing excessive current to circuits 120, such that the current may cause harm to load 135. After detecting a current overload, processor 125 can transmit a signal to switching system 130 to impede current flow through the circuits. Thus, circuit 120-1 would not output AC signal 111-1, circuit 120-2 would not output AC signal 111-2, and circuit 120-3 would not output AC signal 111-3. By way of another example, processor 125 can identify that a phase loss signal was transmitted to switching system 130 due to a phase imbalance between AC signals 106. Accordingly, processor 125 can transmit a signal to switching system 130 to impede current flow from line 105 to load 135. To impede or allow current to flow through circuits 120, switching system 130 of load protection device 110 may include one or more switches. When such a switch is open, current is impeded within circuits 120, and when the switch is closed, current flow is unrestricted through circuits 120. The signal transmitted by processor 125 in response to the detection of the fault can cause switching system 130 to change a switch from "closed" to "open," for example.

Based on the determination, in operation 210, that the mode is a second mode, processor 125 can disable (235) the phase loss analysis (phase loss logic 116). Processor 125 executes switching logic 118 to disable the phase loss logic 116. By disabling phase loss analysis, processor 125 can ensure that current flow is not impeded through circuits 120 based on detection of a phase imbalance between AC signals 106. This allows load protection device 110 to protect non-motor loads without phase loss sensitivity impacting operations of load protection device 110. Disabling phase loss logic 116 may entail inhibiting at least a portion of phase loss logic 116 from being executed. For example, disabling phase loss logic 116 may entail disabling instructions that transmit the phase loss signal. In this example, processor 125 would not transmit a phase loss signal to switching system 130 despite detecting a phase imbalance between one or more of AC signals 106. In another example, disabling phase loss logic 116 may entail disabling detecting the phase imbalance. In this example, processor 125 may analyze electrical values of AC signals 106 but not the phases of AC signals 106. Accordingly, processor 125 would not transmit a phase loss signal to switching system 130 because processor 125 would not detect a phase imbalance between one or more of AC signals 106.

Next, in operation 240, processor 125 can perform (240) branch circuit protection analysis. This entails processor 125 executing protection logic 117 as in operation 220 from the first mode of operation of load protection device 110.

In operation 245, processor 125 detects (245) a fault based on a detection of an electrical value of the values analyzed exceeding a second threshold value. Unlike operation 225, processor 125 does not detect a fault based on the detection of a phase imbalance, because processor 125 disables phase loss logic 116 in operation 235 due to switching logic 118 determining that load protection device 110 is in the second mode, or circuit breaker mode.

Lastly, in operation 250, processor 125 transmits (250) a signal to switching system 130 to impede current flow within circuits 120 and to load 135 via AC signals 111. This prevention of current flow may be based on a fault, such as current overload, rather than phase loss between AC signals 106.

Figure 3:
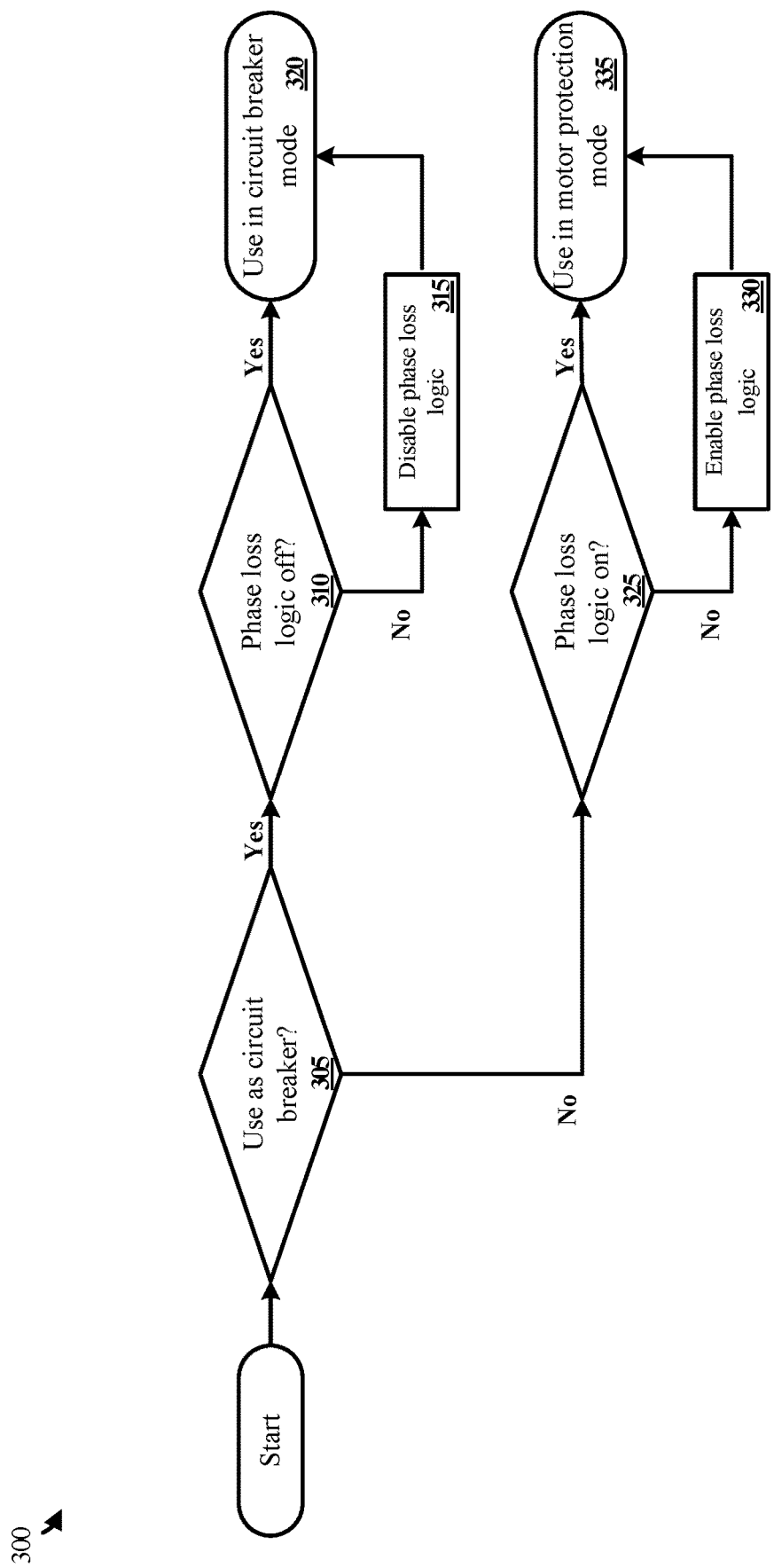
FIG. 3 illustrates an example flow chart for operating a protection device in one of multiple modes in accordance with some embodiments of the present technology.

FIG. 3 illustrates an example flow chart for operating a protection device in one of multiple modes in accordance with some embodiments of the present technology. FIG. 3 includes process 300, each operation noted parenthetically in the discussion below and which reference elements of FIG. 1. It may be appreciated that process 300 can be implemented on software, firmware, hardware, or any combination and/or variation thereof. For example, process 300 can be executed on or by load protection device 110 of FIG. 1.

To begin, in operation 305, processor 125 of load protection device 110 determines the mode of load protection device 110 by executing switching logic 118 stored in memory 115 of load protection device 110. A first mode of load protection device 110 may include a motor protection mode, while a second mode of load protection device 110 may include a circuit breaker mode. The mode of load protection device 110 may be selected manually by a user via a physical switch or via a mode selection setting. Alternatively, the mode may be pre-configured. Upon determining the mode, processor 125 can identify whether load protection device 110 is being used (305) as a circuit breaker or a switching device.

If load protection device 110 is in the circuit breaker mode, processor 125 next determines (310) whether phase loss logic 116 is off. While operating in circuit breaker mode, it may be advantageous to turn phase loss logic 116 off to allow load protection device 110 to feed AC signals 111 to three loads, each receiving a single-phase AC signal. If phase loss logic 116 is off, load protection device 110 can be used (320) in circuit breaker mode. However, if phase loss logic 116 is on, processor 125 can be configured to disable (315) phase loss logic 116 via switching logic 118.

If, on the other hand, load protection device 110 is not in circuit breaker mode, processor 125 can determine that load protection device 110 is in motor protection mode. Accordingly, processor 125 can determine (325) whether phase loss logic 116 is on or not. If phase loss logic 116 is on, load protection device 110 can be used (335) in motor protection mode. If not, processor 125 can enable (330) phase loss logic 330 via switching logic 118, then operate load protection device 110 as a motor protection device.

Figure 4A:
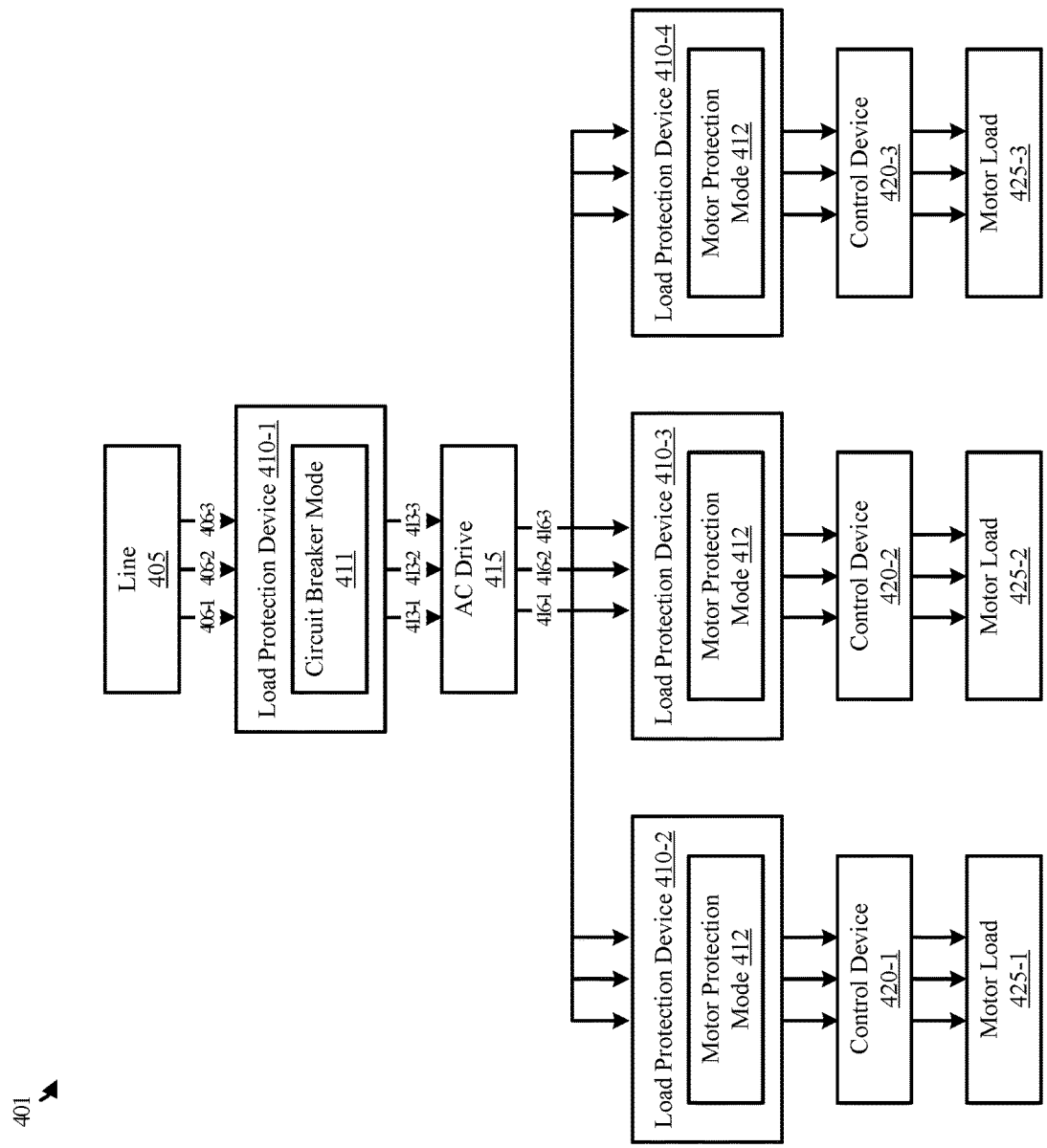
FIGS. 4A and 4B illustrate example operating environments demonstrating use of a protection device in multiple modes in accordance with some embodiments of the present technology.
Figure 4B:
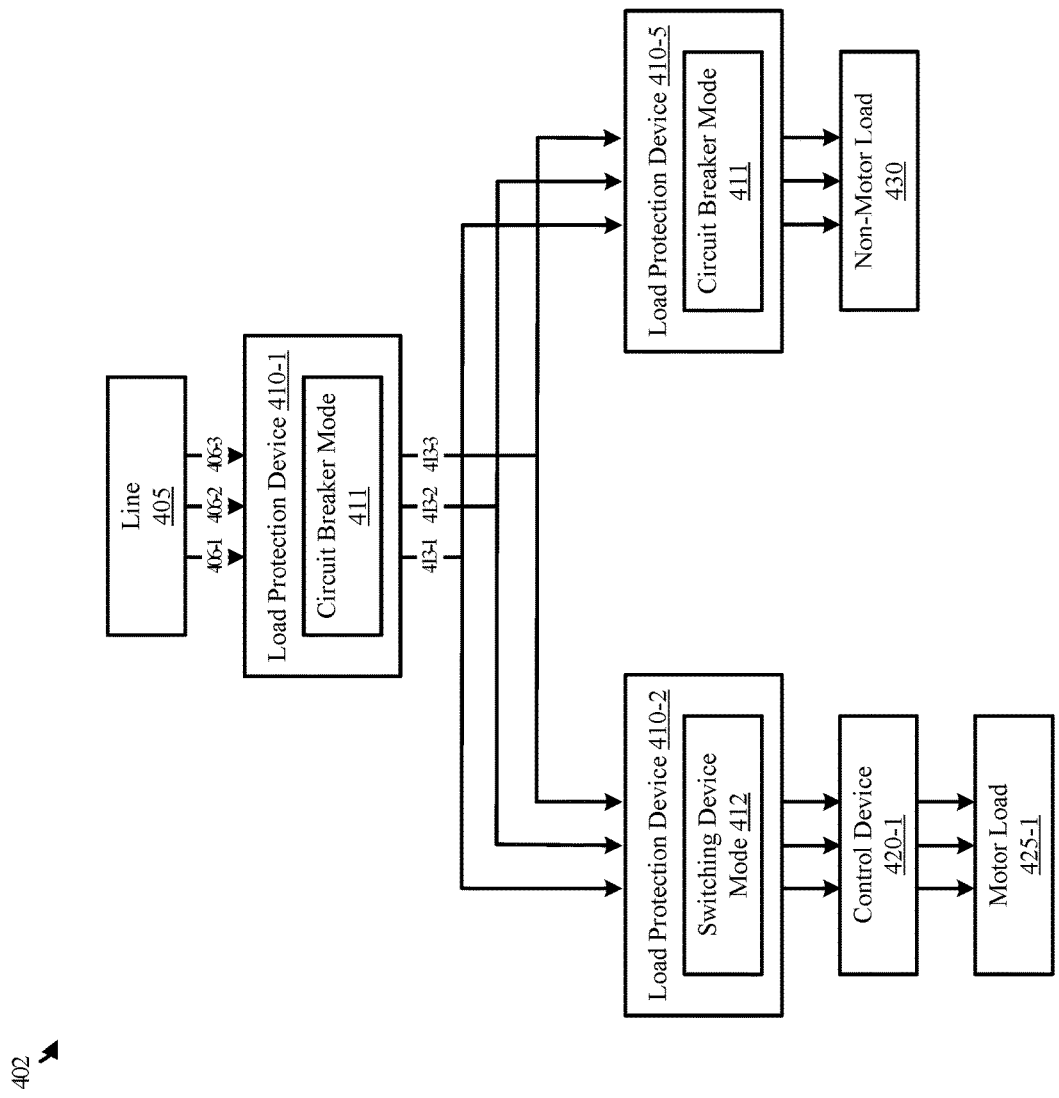

FIGS. 4A and 4B illustrate example operating environments 401 and 402, respectively, demonstrating use of load protection device 410 in one of multiple modes in accordance with some embodiments of the present technology. FIG. 4A includes operating environment 401, which further includes line 405, load protection devices 410-1, 410-2, 410-3, and 410-4 (collectively referred to herein as load protection devices 410), AC drive 415, control devices 420-1, 420-2, and 420-3 (collectively referred to herein as control devices 420), and motor loads 425-1, 425-2, and 425-3 (collectively referred to herein as motor loads 425). FIG. 4B includes operating environment 402, which also includes line 405, load protection devices 410, control device 420-1, motor load 425-1, and further includes non-motor load 430.

Referring first to operating environment 401 of FIG. 4A, line 405 is representative of an AC power supply, such as a power grid. Line 405 produces AC signals (AC signal 406-1, AC signal 406-2, and AC signal 406-3; collectively referred to herein as AC signals 406), each AC signal having a different phase with respect to one another. For example, in a traditional grid, line 405 may produce voltage and current being 120 degrees out of phase from one another. Line 405 feeds the AC signals 406 to load protection device 410-1, which measures and analyzes AC signals 406 before providing power from line 405 to AC drive 415 and further downstream.

AC signal 406-1 is a first AC signal produced by line 405. AC signal 406-1 includes a voltage and a current capable of providing power to loads in operating environment 401. AC signal 406-1 is one of three AC signals 406 that function together to provide three-phase AC power in an industrial automation environment.

AC signal 406-2 is a second AC signal produced by line 405. AC signal 406-2 includes the same voltage and current as AC signal 406-1, but at a different phase with respect to AC signal 406-1.

AC signal 406-3 is a third AC signal produced by line 405. AC signal 406-3 includes the same voltage and current as AC signals 406-1 and 406-2, but at a different phase with respect to both AC signals 406-1 and 406-2.

Load protection device 410-1 is representative of a circuit and load protection component coupled between a power supply (line 405) and a downstream component (e.g., AC drive 415) in an industrial automation environment. Load protection device 410-1 is provided to protect loads from power issues stemming from AC signals 406. To provide such protection, load protection device 410-1, and other ones of load protection devices 410 of operating environment 401, includes various components like ones illustrated in FIG. 1. For example, load protection device 410-1 can include a memory (with logic), a processor, and circuitry (e.g., circuits and switching elements) coupled between AC inputs and outputs.

In operating environment 401, load protection device 410-1 operates in circuit breaker mode 411. In this mode, load protection device 410-1 functions as a circuit breaker (e.g., a molded case circuit breaker (MCCB)) whereby it can provide current overload and short-circuit protection to a branch circuit, and consequently, to one or more downstream components, such as AC drive 415. However, load protection device 410-1 does not provide phase loss protection, as in a motor protection mode, because switching logic of load protection device 410-1 identifies the mode and disables phase loss logic of load protection device 401-1. In this way, load protection device 410-1 receives AC signals 406, performs overload protection analysis on each of AC signals 406, and outputs corresponding AC signals 413 to AC drive 415. AC signals 413 includes AC signals 413-1, 413-2, and 413-3, each having values (e.g., voltage, current, and phase) corresponding to AC signals 406-1, 406-2, and 406-3, respectively.

AC drive 415 is representative of a device configured to drive AC power to further downstream components, such as switching devices, controllers or control devices, power electronics systems, and loads. AC drive 415 receives AC signals 413 and provides AC signals 416 to load protection devices 410-2, 410-3, and 410-4. AC signals 416 include AC signals 416-1, 416-2, and 416-3, each having values corresponding to AC signals 413-1, 413-2, and 413-3, respectively. Accordingly, AC drive 415 provides each of load protection devices 410-2, 410-3, and 410-3 with three-phase AC power from line 405.

Load protection devices 410-2, 410-3, and 410-4 each operate in motor protection mode 412 unlike load protection device 410-1. In this mode, load protection devices 410-2,

410-3, and 410-4 function like switching devices (e.g., motor protective switching devices (MPSD)) whereby they can provide current overload and short-circuit protection and phase loss protection to one or more downstream components, such as control devices 420 and motor loads 425. In contrast with circuit breaker mode 411, switching logic of load protection devices 410-2, 410-3, and 410-4 identify motor protection mode 412 and enable phase loss logic, such that phase loss analysis can be performed by respective ones of load protection devices 410-2, 410-3, and 410-4. Phase loss logic can enable load protection devices 410 to perform phase loss analysis and detect imbalances between phases of AC signals 416 that exceed a first threshold value. For example, when the current measurement of a phase of one of AC signals 416 is significantly different from the current measurement of one or more phases of one or more other ones of AC signals 416, load protection devices 410, via a switching system (not shown; e.g., switching system 130 of FIG. 1), can impede current from flowing to control devices 420. When the currents of the phases of AC signals 416 are not significantly different, or do not breach the first threshold value, load protection devices 410 can provide three-phase AC power to control devices 420.

Control devices 420 are representative of control units, controllers, and the like configured to provide control over motor loads 425. For example, control devices 420 can control the speed, among other parameters, of motor loads 425. Control device 420-1 can control motor load 425-1, control device 420-2 can control motor load 425-2, and control device 420-3 can control motor load 425-3. Motor loads 425 are representative of motors in an industrial or commercial environment operable using three-phase AC power, such as power from line 405.

Referring next to FIG. 4B, operating environment 402 includes line 405, load protection device 410-1, load protection device 410-2, and load protection device 410-5. Like operating environment 401, load protection device 410-1 also operates in circuit breaker mode 411 and provides AC power (via AC signals 413) to load protection devices 410-2 and 410-5. However, in this scenario, load protection device 410-1 does not provide AC signals 413 to an AC drive. Instead, individual outputs of load protection device 410-1 are directly coupled with individual inputs of load protection devices 410-2 and 410-5. In some examples, AC signals 413 function as branch circuits between load protection device 410-1 and load protection devices 410-2 and 410-5.

Load protection device 410-2, operating in motor protection mode 412, receives AC signals 413 and provides AC power to control device 420-1 and further to motor load 425-1. Load protection device 410-5, however, operates in circuit breaker mode 411 and is configured as described above with respect to load protection device 410-1 in FIG. 4A. By operating in circuit breaker mode 411, load protection device 410-5 can provide additional circuit breaker protection to one or more of non-motor load 430.

It may be appreciated to one skilled in the art that any combination or variation of load protection devices and loads (motor and non-motor) can be coupled to load protection device 410-1 operating in circuit breaker mode 411.

While some examples provided herein are described in the context of an orchestration engine, it should be understood that the digital twin orchestration systems and methods described herein are not limited to such embodiments and may apply to a variety of other digital twin environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A protection device, comprising:
   three power inputs;
   three power outputs;
   three circuits, each circuit corresponding to one of the three power inputs and one of the three power outputs;
   a switching system coupled to the three circuits;
   a processor; and
   a memory comprising:
      phase loss logic that, when executed by the processor, detects a phase imbalance between the three power inputs and transmits a phase loss signal to the switching system in response to the phase imbalance exceeding an imbalance threshold value;
      protection logic that, when executed by the processor, analyzes electrical values associated with the three power inputs and transmits a signal to the switching system to impede current flow within the three circuits and to the corresponding power output based on at least the electrical values exceeding an overload threshold value; and
      switching logic that, when executed by the processor, enables the phase loss logic based on detecting a first mode of two modes of the protection device and disables the phase loss logic based on detecting a second mode of the two modes such that the phase loss logic is inhibited from detecting the phase imbalance.

2. The protection device of claim 1, further comprising a mode switch, wherein the switching logic detects one of the first mode and the second mode based on a state of the mode switch.

3. The protection device of claim 1, wherein the first mode is a motor protection mode, and wherein the second mode is a circuit breaker mode.

4. The protection device of claim 1, wherein the memory further comprises a mode selection setting, and wherein the switching logic detects one of the first mode and the second mode based on a state of the mode selection setting.

5. The protection device of claim 4, wherein the mode selection setting comprises a user-defined parameter, stored in the memory, for enabling and disabling the phase loss logic.

6. The protection device of claim 1, wherein the switching logic that disables the phase loss logic comprises instructions stored in the memory that, when executed by the processor, inhibit the processor from executing at least a portion of the phase loss logic including the instructions that transmit the phase loss signal.

7. The protection device of claim 5, wherein the user-defined parameter is set by a user via a graphical user interface (GUI).

8. A method, comprising:
   receiving, at a protection device, three power inputs;
   determining, by the protection device, a mode of two modes of the protection device;
   based on a determination that the mode is a first mode of the two modes:
      continuously performing phase loss analysis that includes detecting a phase imbalance between the three power inputs;
      continuously performing load and circuit protection analysis that includes analyzing electrical values associated with the three power inputs including the phase imbalance;
      detecting a fault based on at least one of detection of the phase imbalance exceeding a first threshold value and detection of an electrical value of the electrical values exceeding a second threshold value; and
      in response to detecting the fault, transmitting a signal to a switching system to impede current flow within three circuits and to three power outputs, wherein each circuit of the three circuits corresponds to one of the three power inputs and one of the three power outputs; and
   based on a determination that the mode is a second mode of the two modes:
      disabling the phase loss analysis such that phase loss logic performing the phase loss analysis is inhibited from detecting the phase imbalance;
      continuously performing branch circuit protection analysis;
      detecting the fault based on the detection of the electrical value of the electrical values exceeding the second threshold value; and
      in response to detecting the fault, transmitting the signal to the switching system to impede the current flow within the three circuits and to the three power outputs.

9. The method of claim 8, wherein the first mode is a motor protection mode, and wherein the second mode is a circuit breaker mode.

10. The method of claim 8, wherein determining the mode of the two modes of the protection device comprises identifying a state of a physical mode selection switch of the protection device.

11. The method of claim 8, wherein determining the mode of the two modes of the protection device is based on a user-defined parameter, stored in a memory of the protection device, for enabling and disabling the phase loss analysis.

12. The method of claim 11, wherein the user-defined parameter is configured by a user via a graphical user interface (GUI).

13. The method of claim 8, wherein disabling the phase loss analysis comprises allowing the current flow within the three circuits and to the three power outputs despite the detection of the phase imbalance exceeding the first threshold value.

14. The method of claim 8, wherein disabling the phase loss analysis comprises disabling the transmitting the signal to the switching system despite the phase imbalance exceeding the first threshold value.

15. A protection device, comprising:
  three power inputs;
  three power outputs;
  three circuits, each circuit corresponding to one of the three power inputs and one of the three power outputs;
  a switching system coupled to the three circuits;
  one or more processors; and
  a memory having stored thereon instructions that, upon execution by the one or more processors, cause the one or more processors to:
    determine a mode of two modes of the protection device;
    based on a determination that the mode is a first mode of the two modes:
      continuously perform phase loss analysis that includes detecting a phase imbalance between the three power inputs;
      continuously perform load and circuit protection analysis that includes analyzing electrical values associated with the three power inputs including the phase imbalance;
      detecting a fault based on at least one of detection of the phase imbalance exceeding a first threshold value and detection of an electrical value of the electrical values exceeding a second threshold value; and
      in response to detecting the fault, transmit a signal to the switching system to impede current flow within the three circuits and to the three power outputs; and
    based on a determination that the mode is a second mode of the two modes:
      disable the phase loss analysis such that phase-loss logic performing the phase loss analysis is inhibited from detecting the phase imbalance;
      continuously perform branch circuit protection analysis;
      detecting the fault based on the detection of the electrical value of the electrical values exceeding the second threshold value; and
      in response to detecting the fault, transmit the signal to the switching system to impede the current flow within the three circuits and to the three power outputs.

16. The protection device of claim 15, wherein the first mode is a motor protection mode, and wherein the second mode is a circuit breaker mode.

17. The protection device of claim 15, further comprising:
  a mode switch, wherein the instructions to determine the mode of the protection device comprise further instructions that, upon execution by the one or more processors, cause the one or more processors to identify a state of the mode switch.

18. The protection device of claim 15, wherein the instructions to determine the mode of the protection device comprise further instructions that, upon execution by the one or more processors, cause the one or more processors to determine the mode based on a mode selection setting stored in the memory.

19. The protection device of claim 18, wherein the mode selection setting comprises a user-defined parameter in the memory set by a user via a graphical user interface (GUI).

20. The protection device of claim 15, wherein the instructions to disable the phase loss analysis comprise further instructions that, upon execution by the one or more processors, cause the one or more processors to disable the instructions to transmit the signal to the switching system despite the phase imbalance exceeding the first threshold value.

* * * * *